United States Patent
Pierrat

[11] 3,841,108
[45] Oct. 15, 1974

[54] POWER-REFRIGERATION APPARATUS FOR RECREATIONAL VEHICLES AND THE LIKE

[75] Inventor: Michel A. Pierrat, Andover, Mass.

[73] Assignee: Automatic Radio Mfg. Co., Inc., Melrose, Mass.

[22] Filed: Dec. 17, 1973

[21] Appl. No.: 425,691

[52] U.S. Cl. ............... 62/236, 62/323, 62/239, 62/243, 62/244
[51] Int. Cl. ............................. F25b 27/00
[58] Field of Search ............ 62/236, 241, 243, 244, 62/239, 323

[56] References Cited
UNITED STATES PATENTS

| | | | |
|---|---|---|---|
| 2,101,495 | 12/1937 | Ferris | 62/241 |
| 2,248,654 | 7/1941 | Ballou | 62/241 |
| 2,467,398 | 4/1949 | Miller | 62/236 |
| 2,746,267 | 5/1956 | Sellstrom | 62/236 |
| 2,986,896 | 6/1961 | Hann | 62/323 |
| 3,218,821 | 11/1965 | Spatt | 62/244 |

*Primary Examiner*—William J. Wye
*Attorney, Agent, or Firm*—James E. Mrose

[57] ABSTRACT

Recreational vehicles, and the like, which have occasions to rely upon accessory-driving power developed wholly while travelling under their own motive forces, or wholly while supplied from an external source at standstill, or wholly while supplied from a self-contained source at standstill, are provided with an auxiliary system, for developing both regulated electrical power and mechanical-refrigeration power, in which as-needed independent primary drives by an electric motor, hydraulic motor, and auxiliary internal-combustion engine, and their collateral as-needed mechanical isolation from one another, are automatically and uniquely achieved by way of centrifugal clutches requiring no electrical excitations, and in which related electrical controls for the system are all therefore of advantageously low-power types.

14 Claims, 5 Drawing Figures

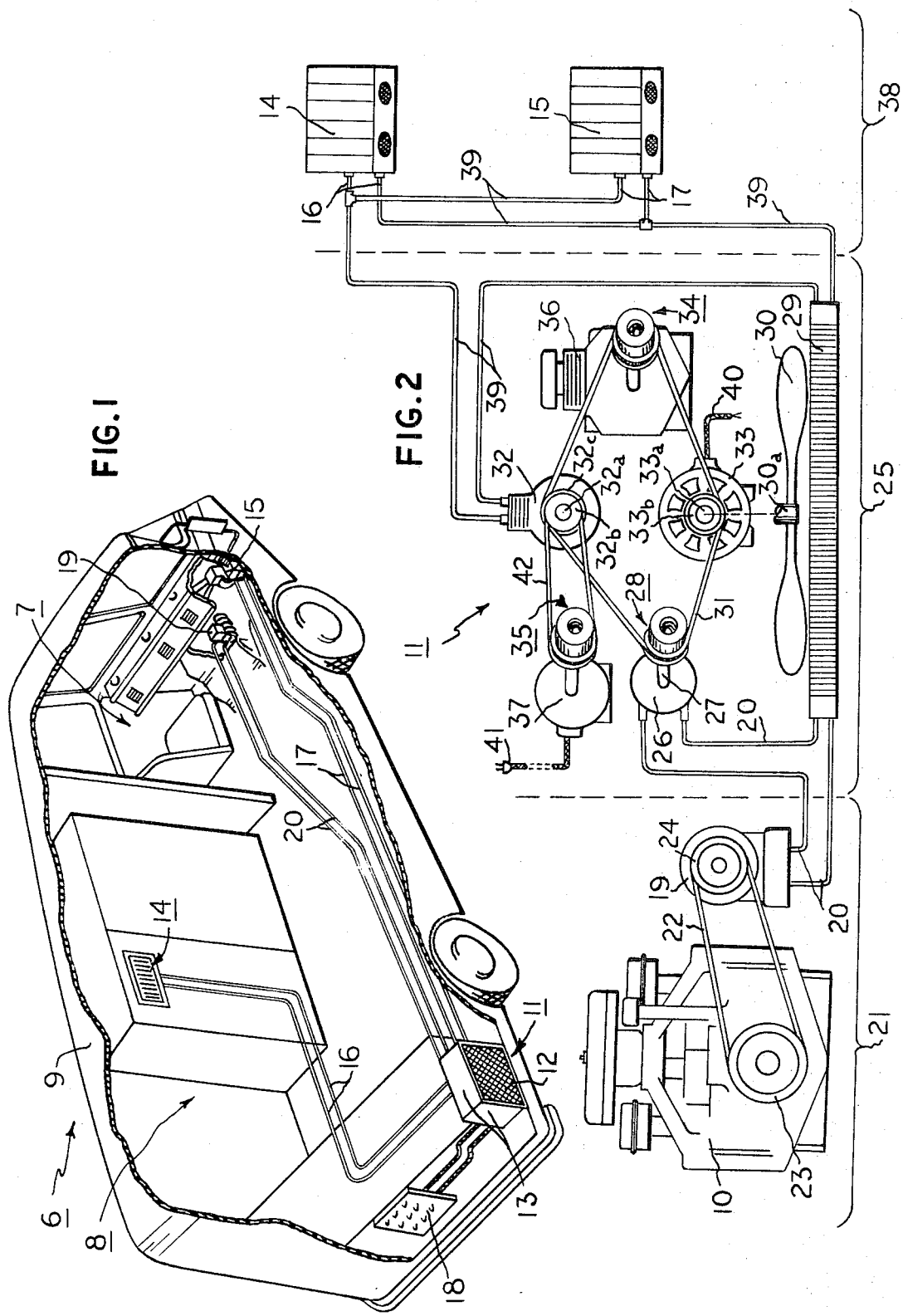

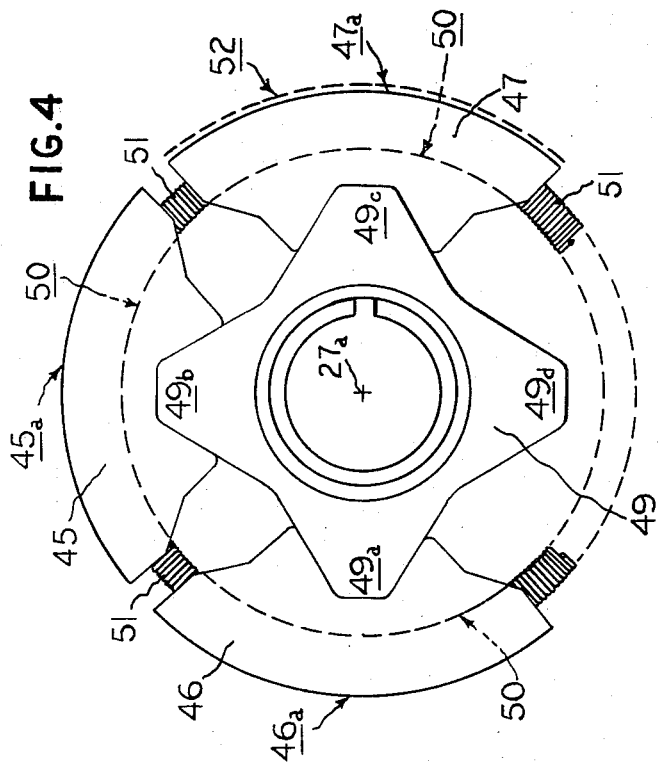
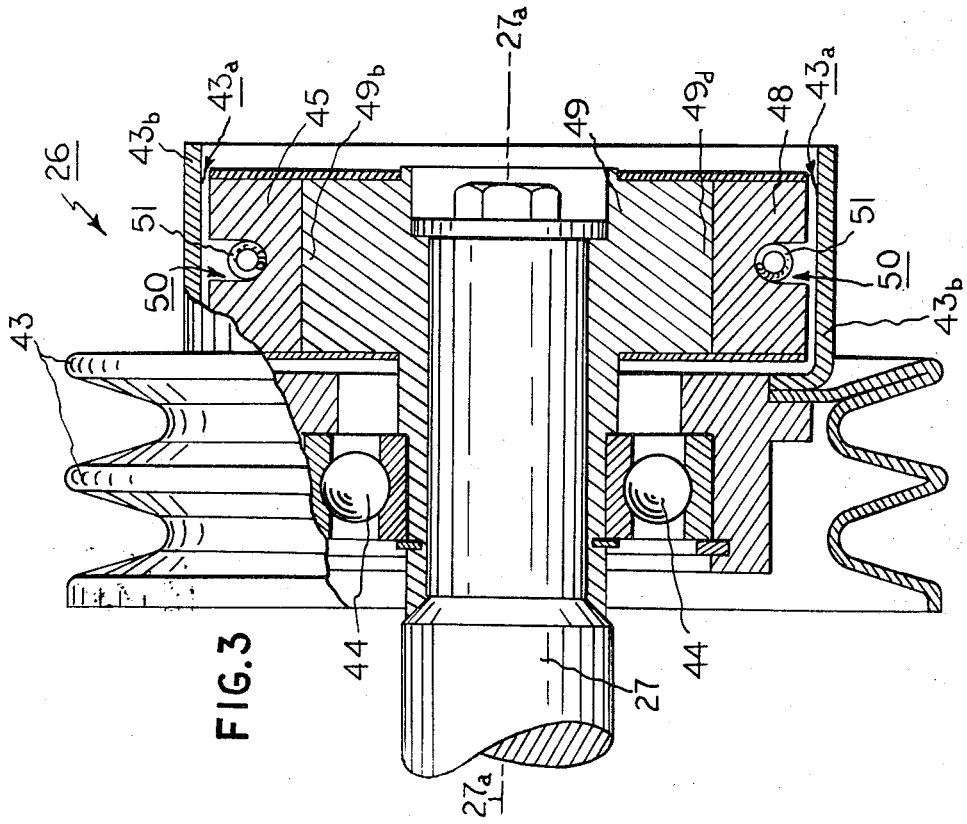

POWER-REFRIGERATION APPARATUS FOR RECREATIONAL VEHICLES AND THE LIKE

BACKGROUND OF THE INVENTION

Many self-powered vehicles, whether for land or other travel, and whether intended for private, commerical, or other uses, commonly require significant amounts of power for excitation of accessory equipment, and yet the demands for such power do not always justify the expense, noise, heat, pollution and inefficiency which would result if the primary motive source, or main engine, of the vehicle were to be relied upon to provide that power while the vehicle is not in transit with its engine necessarily running anyway. By way of particularly appropriate example, it is noted that modern automotive campers, or so-called "recreational vehicles," may include such power-demanding accessory equipment as full air-conditioning and a wide variety of heavy-drainage electrical appliances matching those found in many conventional homes. During those times when such a vehicle is "on the road," travelling under power of its main engine, the latter may be tapped conveniently for relatively efficient drives of a refrigeration and/or air-conditioning compressor and of an electrical generator serving as a supply for other accessory equipment. At different times, however, as when the vehicle is temporarily encamped either near an external "shore" supply of external electrical power or under "wilderness" conditions remote from such an external supply, it becomes seriously inefficient to run the main engine solely to serve the needs of the accessory equipment and systems, and, in addition, the attendant noise, heat, polluting effects, and engine deterioration, can be highly objectionable. For the latter reasons, it has been known to resort to an auxiliary electric motor, under "shore" supply conditions, and to resort to an auxiliary gasoline engine, under "wilderness" conditions, for the purpose of driving air-conditioning compressor and electrical-generating apparatus. These two auxiliary motive sources have heretofore been packaged as a unit, with appropriate belt drives for the generator and compressor and with electromagnetic clutching acting to place one or the other of the motive sources into service independently, as required. Toward these same general objectives, but with distinct improvement, the present invention also involves the use of a packaged unit containing both an auxiliary electric motor and an auxiliary internal-combustion engine, and, further, advantageously includes in that unit a third motive source in the form of a hydraulic motor which is rotated at a substantially constant speed by hydraulic pumping apparatus associated with the main engine. An appropriate version of the latter type of constant-speed drive is disclosed in my U.S. Pat. No. 3,587,237. Each of these three motive sources serves, at different times, to drive either or both an electrical generator and a refrigerator compressor, by way of pulley and belting couplings, through wholly mechanical centrifugal-clutching provisions which automatically either remain passively idling or develop positive driving forces, the latter occurring of its own accord whenever each of these motive sources is brought into operation while the vehicle is experiencing a different environmental condition of use. Importantly, the associated electrical control system is of a relatively inexpensive and uncomplicated low-power type, and does not involve the drains which would attend the excitations of electromagnetic clutches.

SUMMARY OF THE INVENTION

By way of a summary account of practice of this invention in one of its aspects, a motorized home or so-called "recreational vehicle" having its main engine in one location is also equipped with a remote and conveniently-accessible power unit or module in which are disposed both a refrigeration (air-conditioning) compressor and an electrical alternator. Air-conditioning evaporator assemblies serving the driver and living compartments are coupled with the compressor via suitable conduits, and the alternator output is delivered via cables to various electrical outlets for powering of accessory equipment at substantially the frequency and voltage of conventional utility-supplied power (for example, 60 cycles and 115 volts). Both the alternator and compressor have their rotor structures turned by a belt-and-pulley assembly which may be driven positively by any one of three motive sources: an electric motor; a relatively small auxiliary gasoline engine; and a hydraulic motor. All three of these motive sources have their drive shafts permanently coupled into the belt-and-pulley assembly; however, each such coupling associated with each of the three drive shafts includes a centrifugal-clutch which automatically places the motive unit into driving relationship to the assembly when it is developing power and otherwise allows it to remain essentially isolated from the operation of that assembly. No manual shifting of belting or pulleys is involved, nor is the system dependent upon electrical power and switching such as would be required with electromagnetic clutching. The related mechanically-interlocked electrical switch by which the three modes of operation of the power unit are controlled is of a circuit-isolating type which insures that only one motive source can function at any given time. When external or "shore" power is plugged into the vehicle, that switch allows the power-unit motor alone to be excited, and, through its centrifugal clutch, it acts to rotate the compressor and thereby provide the needed air-conditioning and/or refrigeration effects; that same external source can at such times supply other electrical power needs of the vehicle, and the motor therefore need not be coupled to drive the alternator. Under "wilderness" conditions where no external source of electrical power is available, the switch allows vehicle battery power to commence ignition, fuel-pumping, and starter-motor operations for the auxiliary gasoline engine, whereby the latter then automatically clutches itself into driving relation to both the compressor and alternator, to serve all the vehicle power needs. While the vehicle is in transit, the switch independently controls the electrical excitation of valving which permits the hydraulic motor to be rotated at a substantially constant speed by hydraulic pumping associated with the main vehicle engine, whereby the hydraulic motor then automatically clutches itself into driving relation to both the compressor and alternartor.

Accordingly, it is one of the objects of the present invention to provide novel and improved powering of electrical and refrigeration and/or air-conditioning systems aboard vehicles, including motive sources which are automatically brought into operation independently under different environmental conditions by way of centrifugal clutching.

Another object of the invention is the provision of unique and efficient powering units, for the air-conditioning and electrical systems of recreational vehicles and the like, in which a hydraulic motor driven by the vehicle engine, an auxiliary gasoline engine, and an electric motor powered from an external source, are centrifugally-clutched into driving functions as their selective uses are required, but otherwise remain essentially passive in a power train serving a compressor and alternator.

It is a further object to provide compact, efficient, and economical power modules for vehicles in which any selected one of three motive sources is automatically clutched centrifugally into substantially constant-speed driving relationship with a compressor and/or electrical generator, under control of low-power switching circuitry promoting isolation of the respective operations of these motive sources such that they each can serve only independently under on-the-road, externally-powered standstill, and self-powered standstill, conditions of the vehicles.

BRIEF DESCRIPTION OF THE DRAWINGS

Although the aspects of this invention which are believed to be novel are set forth in the appended claims, additional details as to preferred practices and as to the further advantages, objects and features of the invention may be most readily comprehended through reference to the following description taken in connection with the accompanying drawings, wherein:

FIG. 1 is a pictorial view, with sections broken away, of portions of a recreational vehicle equipped with a power-refrigeration unit such as that of the present invention, together with certain of the associated conduits and cables;

FIG. 2 illustrates a vehicle network, including a power unit in accordance with this invention, for triple-mode powering of a compressor and/or alternator, with network elements being shown in simplified pictorial form;

FIG. 3 provides a side view, partly in cross-section, of a centrifugal clutch and pulley unit useful in the power unit of FIG. 2.

FIG. 4 is an end view of portions of the centrifugal clutch appearing in FIG. 3.

DESCRIPTION OF THE PREFERRED EMBODIMENTS

Figure 5:
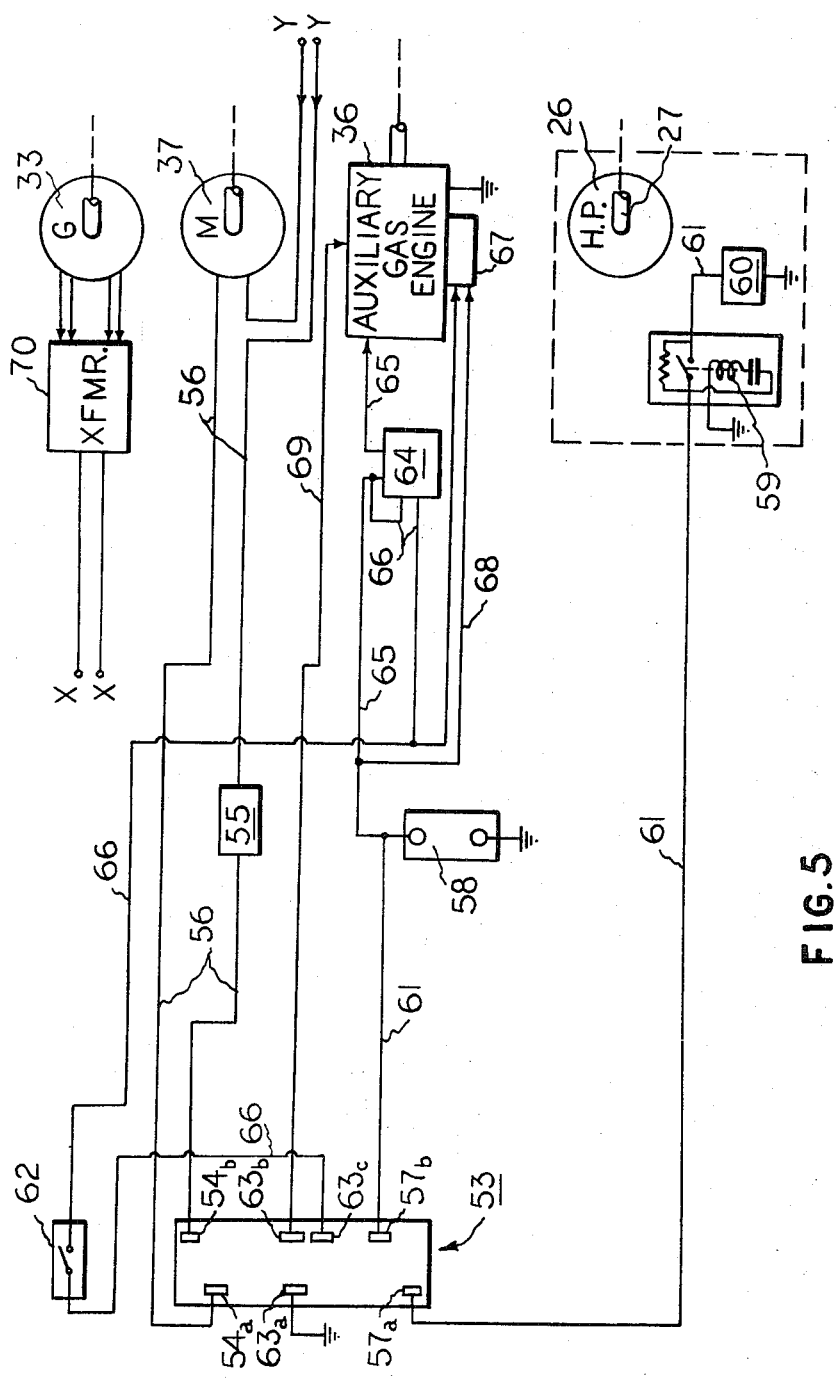
FIG. 5 is a partly-schematic and partly block-form diagram of electrical switching and interconnections serving the improved power-refrigeration unit.

Having reference to the drawings, wherein the same reference characters designate identical or functionally-corresponding parts throughout the several illustrations, and in the first instance to FIG. 1 thereof, there is shown a motorized camper or so-called "recreational vehicle," 6, such as is currently popular and includes a forward driving area 7 and rear living quarters 8 housed within the same van-type body 9 of a motor vehicle. The usual main internal-combustion engine, 10, in FIG. 2, may be located either at the front or rear, and serves principally as the prime mover for the vehicle, although its usual collateral functions may include heating, defrosting, and powering of accessory electrical, mechanical and hydraulic equipment. Its design for efficiency and economy does not inherently favor its use as a power source for accessories except when the vehicle is also travelling, and the same is true in relation to attendant noise, heat and emissions of pollutants. As a separate unit, or module, 11, preferably at an externally-accessible rear location, as illustrated, there is provided an assemblage of three auxiliary motive sources and their unique couplings with a refrigeration and/or air-conditioning compressor and an electrical alternator. Unit 11 is conveniently recessed into an accommodating opening in the vehicle body, with a flush vent grille 12, and is otherwise shrouded by panelling 13, either built into the vehicle or fixed about the unit itself, to shield against fumes and heat. A central air-conditioning evaporator and fan assembly, 14, is located in the living compartment 8, and a similar assembly 15 serves the forward driving area 7, both being coupled with a compressor and condenser installation within unit 11 by way of appropriate conduits, 16 and 17. An A.C. power distribution box, 18, receives excitation from an external or "shore" supply, when the same is available at camp sites or the like. In addition, a drive unit 19, for substantially constant-speed actuation of the hydraulic motor in module 11, is powered by main engine 10 and coupled with the motor by way of conduits 20.

As appears from FIG. 2, the drive unit 19 is driven at the site 21 of engine 10, by the illustrated belt 22 and pulleys 23 and 24, for example, and, at the remote site 25 of the power module 11, the associated hydraulic motor 26 can be supplied with pressurized hydraulic fluid, through conduits 20, which cause it to rotate its output shaft 27 and centrifugal clutch and pulley assembly 28 at substantially constant speed. Drive unit 19 preferably comprises a known type of pumping arrangement, with suitable valving which regulates the amount of fluid delivered to the motor 26, and the unit preferably employs an electrically-actuated solenoid valve (not shown) for freely by-passing the fluid around the motor and thereby conserving energy when its rotation is not required. My U.S. Pat. No. 3,587,237 discloses details of arrangements by which such a variable-speed engine may be caused to drive a hydraulic motor at a substantially constant speed, for example. A heat-exchanger for cooling fluid of the constant-speed drive system for hydraulic motor 26 is a provided part of a radiator-type unit 29, behind which is disposed an air-circulating fan 30. Hydraulic pumping of fluid from unit 19 to motor 26, during "on-the-road" operation while the vehicle is powered by its main engine 10, forces hydraulic motor 26 to rotate the centrifugal clutch and pulley assembly 28 at a speed high enough to induce firm automatic clutching which in turn results in positive driving of belt 31. A suitable form of wholly mechanical clutch-and-pulley assembly is discussed later herein with reference to FIGS. 3 and 4. When belt 31 is thus driven by hydraulic motor 26, it causes rotation of the main shaft 32a and pulley 32b of compressor 32 and of the armature shaft 33a and pulley 33b of a.c. generator 33, as well as rotation of the fan shaft 30a. At the same time, belt 31 includes rotation of the pulley elements of clutch-and-pulley assemblies 34 and 35 of the auxiliary internal-combustion engine 36 and of auxiliary electric motor 37, respectively; however, these belt-driven pulley assembleis are not then in clutched relation to the engine 36 and motor 37, but, instead, ride freely upon support bearings (not visible in FIG.

2). Compressor 32 is coupled with remote air-conditioner evaporators 14 and 15 in the aforementioned portions of the vehicle interior, those remote regions being designated by bracketing 38; conduits 39 serve that coupling purpose, and also connect the refrigeration system with its condenser formed as part of the radiator-type structure 25. Alternator 33 supplies its output of substantially-constant-frequency alternating current to electrical accessories and the like via its output cabling 40.

While the vehicle is at rest near an accessible source of external electrical power, as is often the case at commercial camping sites, the auxiliary electric motor 37 is preferably excited efficiently by that source, via a suitable connector 41. The electric motor then drives the compressor 32, through belting 42 and a compressor pulley section 32c. In turn, the belting 31 may follow and drive only alternator 33, in the same manner as described hereinabove in relation to the alternative drive by hydraulic motor 26, except that the clutch-and-pulley assembly 28 will then effect a disengagement from possible restraint by hydraulic motor 26. Output alternator 33 is not critical at such times, because of the availability of externally-supplied electric power to serve the same purposes, if that is desired. In other constructions, further clutching may be provided to isolate the operation of the compressor 32 alone by the electric motor 37, such that nothing else in the power unit 25 is mechanically driven while the vehicle is fed with "shore" electrical power.

In the third or "wilderness" mode of system operation, both air-conditioning (and/or other vehicle refrigeration apparatus) and electrical supply are developed by way of the relatively small and efficient auxiliary internal-combustion engine 36. Once engine 36 commences running, at a predetermined substantially constant speed, it propels belting 31 via its engaged centrifugal-clutch and pulley assembly 34, thereby rotating the alternator 33 and compressor 32, while disengaged clutch portions of assemblies 28 and 35 allow the respective pulley portions of these assemblies to turn freely without restraints by the hydraulic motor 26 or electric motor 37. The desired refrigeration effects and generation of substantially-constant frequency electrical power then take place in a manner already discussed hereinabove.

The centrifugal-clutch and pulley assembly shown in FIGS. 3 and 4 corresponds to the assembly 26 associated with drive shaft 27 of hydraulic motor 10, although it should be understood that assemblies 34 and 35 are preferably of the same construction also. Concentric with the shaft axis 27a — 27a is a V-grooved pulley 43 for cooperation with twin belting, corresponding to the belting 31 represented in FIG. 2. Pulley 43 is rotatable relative to shaft 27, on bearings 44, so long as no clutching engagement occurs between interior surfaces 43a of its integral cylindrical clutch drum portions 43b and the external arcuately-shaped surfaces, such as 45a, 46a, and 47a, of four internally-disposed clutch shoes 45 – 48. These clutch shoes are mounted at the ends of four cooperating teeth 49a – 49d of a shaped clutch drive member 49 mounted in concentric fixed relation to shaft 27. The illustrated tooth shaping is generally that of isosceles trapezoids, and is matched by complementary concave shaping of the radially inner parts of the clutch shoes 45 – 48 mated with them. All of the shoes are peripherally grooved, as designated by reference character 50, to receive a helically-wound annular spring 51 which acts to hold all shoes out of engagement with clutch drum surface 43a unless shaft 27 is positively driven at a substantial speed by hydraulic motor 26. Under the latter conditions, the relatively massive clutch shoes 45 – 48, being rotated by drive member 49, are urged radially outwardly against the yieldable restraint of spring 51, by centrifugal force as well as by similarly-directed forces developed along the sides of the outwardly-tapering teeth 49a – 49d. Clutch faces such as 45a, 46a and 47a thereupon engage the interior clutch drum surfaces 43a and frictionally slave the drum 43b and pulley 43 into rotation with shaft 27. The slight radial movement involved is characterized by dashed linework 52 in FIG. 4, representing the fully-clutched orientation of shoe face 47a.

Use of the wholly automatic and wholly mechanical clutch-and-pulley assemblies in the system under discussion is advantageous not only in that no separate clutching power need be supplied but also in that they involve no related controls which would require attention or which could fail to operate with the needed sequencing and synchronization. Instead, the the associated electrical power demands for the system, per se, and for such controls as are required, are low and may be readily handled by relatively inexpensive low-capacity circuit elements. From what has been said concerning the three modes of operation, it should be evident that these should occur independently of one another, and that no two of the auxiliary engine 36, hydraulic motor 26, and electric motor 37 should function as the power-unit prime mover at the same time.

In FIG. 5, a simplified network aids in understanding how that intended result is assured. There, a principal control is exercised by a mechanically-interlocked manually-actuated three-circuit electrical switch, 53, which is preferably of a push-button type; switches of that type abd meeting the requirements of the network under discussion are commercially available from Ark-Les Switch Corporation, Watertown, Massachusetts, for example. In switch 53, contacts 54a and 54b cooperate with one another, via one push-button (not shown), to control the operation under "shore" conditions while an external source of electrical excitation is being supplied to electric motor 37 via termanals Y — Y, corresponding to connector 41 in FIG. 2. A circuit-breaker 55 may be included in the connections 56 through which the dashboard-mounted switch 53 effects simple ON-OFF control of motor 37 when the operator depresses a selected one or others of the push-buttons, respectively. Another of the push-buttons controls continuity between another set of contacts, 57a and 57b, which serve to apply power from the vehicle battery 58 to a solenoid 59, shown with associated time-delay elements. That solenoid in turn controls a fluid by-pass valve, as referred to earlier herein, in the pumping assembly 19 (FIG. 2), which by-passes hydraulic fluid around hydraulic motor 26 and thereby prevents it from being driven at the intended substantially-constant speed except when the vehicle is in an "on-the-road" mode of operation with its main engine running and when the operator also wishes to have the auxiliary power-refrigeration system function. Under the latter conditions, the solenoid 59 actuates its associated valve to cause fluid to be pumped through motor 26. Protective automatic switching 60, such as switching responsive to oil temperature and/or pressure, is also preferably included in the solenoid circuitry connections 61.

The "wilderness" mode of operation, requiring primemover functioning of the relatively small auxiliary gas engine 36 of the power-refrigeration apparatus, is controlled by a separate "starter" switch, 62, and by the push-button switch contacts 63a, 63b and 63c. A conventional starter relay, 64, supplies power from battery 58 to the starter motor of engine 36 via 65 and the relay itself is energized through leads 66 and switch 62 only after push-button closure is effected between contacts 63c and 63a. Electrical fuel pump 67 is similarly energized, by way of leads 68. Ignition circuit excitation is provided via lead 69, through switch contact 63b. Generator 33 delivers its output to accessory supply terminals X—X after appropriate modification by a transformer 70.

It should be understood that the specific practices and preferred embodiments herein referred to have been offered by way of disclosure, rather than limitation, and that various modifications, additions and substitutions may be effected by those skilled in the art without departure from these teachings; it is therefore aimed in the appended claims to embrace all such variations as fall within the true spirit and scope of this invention.

I claim:

1. Apparatus for powering accessory equipment aboard a vehicle having a main propulsion engine, comprising rotary hydraulic pumping means driven by said engine at the site thereof, a rotary hydraulic motor having an output shaft, means for supplying hydraulic fluid from said pumping means to said hydraulic motor and rotating said shaft, an electric motor having an output shaft rotatable when said motor is energized from an outside source, an auxiliary internal-combustion engine having a rotatable output shaft, accessory-powering means including an electrical generator having a rotatable input shaft and producing electrical power for accessory equipment when said shaft thereof is rotated, a plurality of normally-disengaged mechanical clutches each having a first clutch portion which, when rotated, extends radially into driving engagement with a second cooperating driven clutch portion, means connecting the said first clutch portions for rotation with the output shafts of said hydraulic motor, electric motor and auxiliary engine, respectively, and means mechanically connecting said second clutch portions in rotary motion-transmitting relationship with said input shaft of said generator, whereby each of said hydraulic motor, electric motor and auxiliary engine automatically drives said generator without restraint by the others when brought into operation as a prime mover in said apparatus.

2. Apparatus as set forth in claim 1 wherein said first portions of each of said clutches include clutch shoes movable radially outwardly under influence of centrifugal force as they are rotated, and wherein said second portions of said clutches comprise clutch drum surfaces concentric with and rotatable about the axes of rotations of said first portions.

3. Apparatus as set forth in claim 2 wherein each of said clutches includes spring means yieldable urging said shoes thereof radially inwardly and out of engagement with the clutch drum surfaces thereof, and wherein each of said second portions includes bearing means mounting the clutch drum surfaces thereof for rotation about one of said output shafts.

4. Apparatus as set forth in claim 1 wherein said means mechanically connecting said second clutch portions comprises pulleys connected with different ones of said second clutch portions, and belting mated with said pulleys and connecting all of said second clutch portions in motion-transmitting relation with said generator shaft simultaneously.

5. Apparatus as set forth in claim 1 wherein said hydraulic motor, electric motor and auxiliary engine are in proximate relationship with one another at a site on said vehicle remote from the site of said main engine, wherein said pumping means and hydraulic motor comprise a substantially constant-speed drive producing rotation of said output shaft of said hydraulic motor at substantially a predetermined speed while speeds of said main engine vary, wherein said auxiliary engine and said electric motor power the rotations of said output shafts thereof at substantially said predetermined speed, and wherein said generator comprises an alternator, whereby the frequency of electrical output from said alternator is substantially the same as a commercial frequency at which said electric motor and said accessory equipment are to be energized, irrespective of which of the motors and auxiliary engine drives said alternator at any time.

6. Apparatus as set forth in claim 5 wherein substantially constant-speed drive includes an electrical solenoid controlling by-pass valve means for diverting flow of fluid from said pumping means around said hydraulic motor when said hydraulic motor does not serve as a prime mover in said apparatus, and electrical switching means for independently energizing said solenoid to cause only said hydraulic motor to serve as the prime mover and for independently energizing said electrical motor from an outside electrical source to cause only said electric motor to serve as the prime mover and for independently supplying electrical operating power to electrical components of said auxiliary engine to cause only said auxiliary engine to serve as the prime mover.

7. Apparatus as set forth in claim 6 wherein said switching means comprises a mechanically-interlocked switch having independent switching circuits for independent connection of each of said prime movers for electrical excitation only one at any time.

8. Apparatus as set forth in claim 5 wherein said accessory-powering means further includes a refrigeration-system compressor at said remote site and at least one refrigeration-system evaporator coupled with said compressor and disposed for cooling aboard said vehicle at a different site, said compressor having a rotatable input shaft, and wherein said mechanically connecting means further connects said second clutch portions in rotary motion-transmitting relationship with said input shaft of said compressor.

9. Apparatus for powering accessory equipment aboard a vehicle having a main propulsion engine, comprising an electric motor having an output shaft rotatable when said motor is energized from an outside source, an auxiliary internal-combustion engine having a rotatable output shaft, and a shaft the rotation of which is powered by said main engine in response to electrical excitation associated with components at the site of said main engine, an electrical generator having a rotatable output shaft and producing electrical power for accessory equipment when said shaft thereof is rotated, a refrigeration-system compressor having a rotatable input shaft and at least one refrigeration-system evaporator coupled with said compressor and disposed for cooling aboard said vehicle, a plurality of normally-disengaged mechanical clutches each having a first clutch portion which, when rotated, extends radially into driving engagement with a second cooperating driven clutch portion, means connecting the said first clutch portions for rotation with the output shafts of said electric motor and auxiliary engine, respectively, and means mechanically connecting said second clutch portions in rotary motion-transmitting relationship with the input shafts of said generator and said compressor, whereby each of said electric motor and auxiliary engine automatically drives said generator without restraint by the other when brought into operation as a prime mover in said apparatus.

10. Apparatus as set forth in claim 9 wherein said clutches are centrifugal clutches, wherein said means mechanically connecting said second clutch portions comprise pulleys and belting mated with said pulleys, and wherein bearing means mount said second clutch portions and the pulleys connected therewith for rotation relative to said output shafts of said electric motor and auxiliary engine, and further including electrical switching means for independently energizing said electric motor to cause only said electric motor to serve as the prime mover and for independently applying electrical power to electrical components of said auxiliary engine to cause only said auxiliary engine to serve as the prime mover in said apparatus.

11. Apparatus as set forth in claim 10 wherein said means connecting said first clutch portions connects one of said first portions for rotation by said shaft the rotation of which is powered by said main engine, and wherein said means mechanically connecting said second portions connects said second portion of the clutch for said last-named shaft in motion-transmitting relationship with said input shafts of said generator and compressor, and wherein said switching means includes means for independently providing said electrical excitation to cause only said main engine to serve as the prime mover in said apparatus.

12. Power-refrigeration apparatus for a recreational vehicle, comprising a refrigeration-system compressor and an alternator at a site remote from the main engine of the vehicle and each having a rotatable input shaft, at least one air-conditioner evaporator assembly remote from said compressor and coupled therewith in an air-conditioning system for a compartment of said vehicle, said alternator having electrical output terminals for supplying electrical power to accessory equipment aboard said vehicle, a substantially constant-speed electric motor at said site, a substantially constant-speed auxiliary internal-combustion engine at said site, a substantially constant-speed drive including hydraulic pumping means disposed proximately with and driven by said main engine and a hydraulic motor at said site coupled with said pumping means to receive and to be rotated by hydraulic fluid pumped therefrom, each of said motors and said auxiliary engine having a rotatable output shaft, an electrical solenoid controlling by-pass valve means for diverting flow of fluid from said pumping means around said hydraulic motor, a plurality of normally-disengaged mechanical clutches each having a first clutch portion which, when rotated, extends radially into driving engagement with a second cooperating driven clutch portion, means connecting the said first clutch portions for rotation with the output shafts of said hydraulic motor, electric motor and auxiliary engine, respectively, bearing means mounting said second clutch portions for rotation relative to the cooperating first clutch portions and the output shafts connected therewith, means mechanically connecting said second clutch portions in rotary motion-transmitting relationship with the input shafts of said compressor and said alternator, and manually-actuated electrical switching means for independently energizing said solenoid to cause only said hydraulic motor to serve as the prime mover for said compressor and alternator and for independently energizing said electric motor from an outside electrical source to cause only said electric motor to serve as the prime mover and for independently supplying electrical operating power to electrical components of said auxiliary engine to cause only said auxiliary engine to serve as the prime mover, whereby each of said hydraulic motor, electric motor and auxiliary engine automatically drives said alternator and compressor without restraint by the others when brought into operation as a prime mover by manual actuation of said switching means.

13. Power-refrigeration apparatus as set forth in claim 12 wherein the said first portions of said clutches include clutch shoes movable radially outwardly at least partly under influence of centrifugal force as they are rotated, wherein said second portions comprise clutch drum surfaces concentric with the axes of rotation of said first portions, and wherein said means mechanically connecting said second clutch portions includes pulleys connected with different ones of said second clutch portions and pulleys connected with said input shafts and belting mated with said pulleys connecting all of said second clutch portions in simultaneous motion-transmitting relation with said input shafts of said alternator and compressor.

14. Power-refrigeration apparatus as set forth in claim 13 wherein said switching means ocmprises a mechanically-interlocked push-button switch having independent switching circuits for independent electrical connection of each of said hydraulic motor, electric motor and auxiliary engine for independent electrical excitation allowing their operation as the prime mover only one at a time.

* * * * *